United States Patent

[11] 3,593,198

[72] Inventors Edmund A. Karcher; Jack G. Paschal, both of North Palm Beach, Fla.

[21] Appl. No. 858,018
[22] Filed Sept. 15, 1969
[45] Patented July 13, 1971
[73] Assignee International Telephone and Telegraph Corporation Nutley, N.J.

[54] SOLID-STATE FREE RUNNING TRIANGLE WAVEFORM GENERATOR
12 Claims, 2 Drawing Figs.

[52] U.S. Cl. .......... 331/111, 328/183, 331/143
[51] Int. Cl. .......... H03k 4/50, H03k 4/06
[50] Field of Search .......... 331/111, 143; 328/183

*Primary Examiner*—John Kominski
*Attorneys*—C. Cornell Remsen, Walter J. Baum, Paul W. Hemminger, Percy P. Lantzy, Philip M. Bolton, Isidore Togut, and Charles L. Johnson, Jr.

ABSTRACT: This is a free running triangular waveform generator circuit having a linear output. The circuit includes two constant current generators, one charging and the other discharging a capacitor, a buffer circuit which transmits a first and second voltage level across the capacitor without loading down the capacitor, and a switching circuit which is activated by the two transmitted voltage levels so as to switch one of the constant current generators on and off. The switching and buffering circuits have no capacitors and the charging capacitor is a very small value, thus making the circuit adaptable for integrated circuit fabrication.

INVENTORS
EDMUND A. KARCHER
BY JACK G. PASCHAL
ATTORNEY

SOLID-STATE FREE RUNNING TRIANGLE WAVEFORM GENERATOR

BACKGROUND OF THE INVENTION

This invention relates to a solid-state free running triangular waveform generator having a linear output.

It would be desirable for one to obtain a triangular wave-shaped generator having a good linear output which would be used as the modulating signal in Pulse Width Modulation (PWM) systems. The amount of distortion to be found in the modulation signal will depend greatly on the linearity of the triangular waveform. Therefore, it would be advantageous to produce a self-generating free running triangular waveform having a good linear output.

U.S. Pat. No. 2,602,151 shows a circuit for producing a linear triangular waveform. This circuit uses one constant current generator to charge a capacitor and a second constant current generator to discharge the capacitor. The circuit uses tubes and employs a coupling capacitor in the control circuit and two other capacitors in one of the constant current generators for stabilization purposes. This circuit is not free running and relies on an external signal to switch a discharging constant current generator in and out of the charging circuit. Since the charging and discharging times of the generator signal is dependent upon the externally imposed control waveform, any distortion in this control signal will be translated to the generated waveform. Furthermore, since this circuit uses a number of capacitors other than the charging capacitor this circuit is not adaptable for integrated circuits.

SUMMARY OF THE INVENTION

It is an object of this invention to provide for a solid-state free running triangular waveform generator.

It is another object to provide for a triangular waveform generator suitable for integrated circuit techniques.

According to the broadest aspect of this invention there is provided a free running triangular waveform generator circuit having a linear output comprising a capacitor, a first constant current generator coupled to said capacitor, said first current generator supplying a constant charging current to said capacitor, a second constant current generator coupled to said capacitor, said second current generator removing a constant discharging current from said capacitor, buffering means coupled to said capacitor, said buffering means transmitting a first and second voltage level across said capacitor without loading down said capacitor, and means for switching one of said current generators between a conducting and nonconducting state, said switching means coupled to said buffering means and sensing said first and second transmitted voltage levels whereby said first sensed voltage level causes said switching means to switch said one current generator to said conducting state and said second sensed voltage level causes said switching means to switch said one current generator to said nonconducting state.

A feature of this invention is that said capacitor has a capacitance of less than 1000 pf. and is the only capacitor used for said triangular waveform generator circuit thereby rendering the circuit suitable for manufacture by using integrated circuit techniques.

Another feature of this invention is that said buffering means includes a darlington pair of transistors, the input of said darlington pair being coupled to said capacitor and the darlington pair output being coupled to a third constant current generator. This current generator imposes a fixed load current on said darlington pair so as to eliminate wide variations in the current flowing through said darlington pair, thereby reducing a major cause of nonlinearity in the triangular waveform output.

DESCRIPTION OF THE PREFERRED EMBODIMENTS

Figure 1:
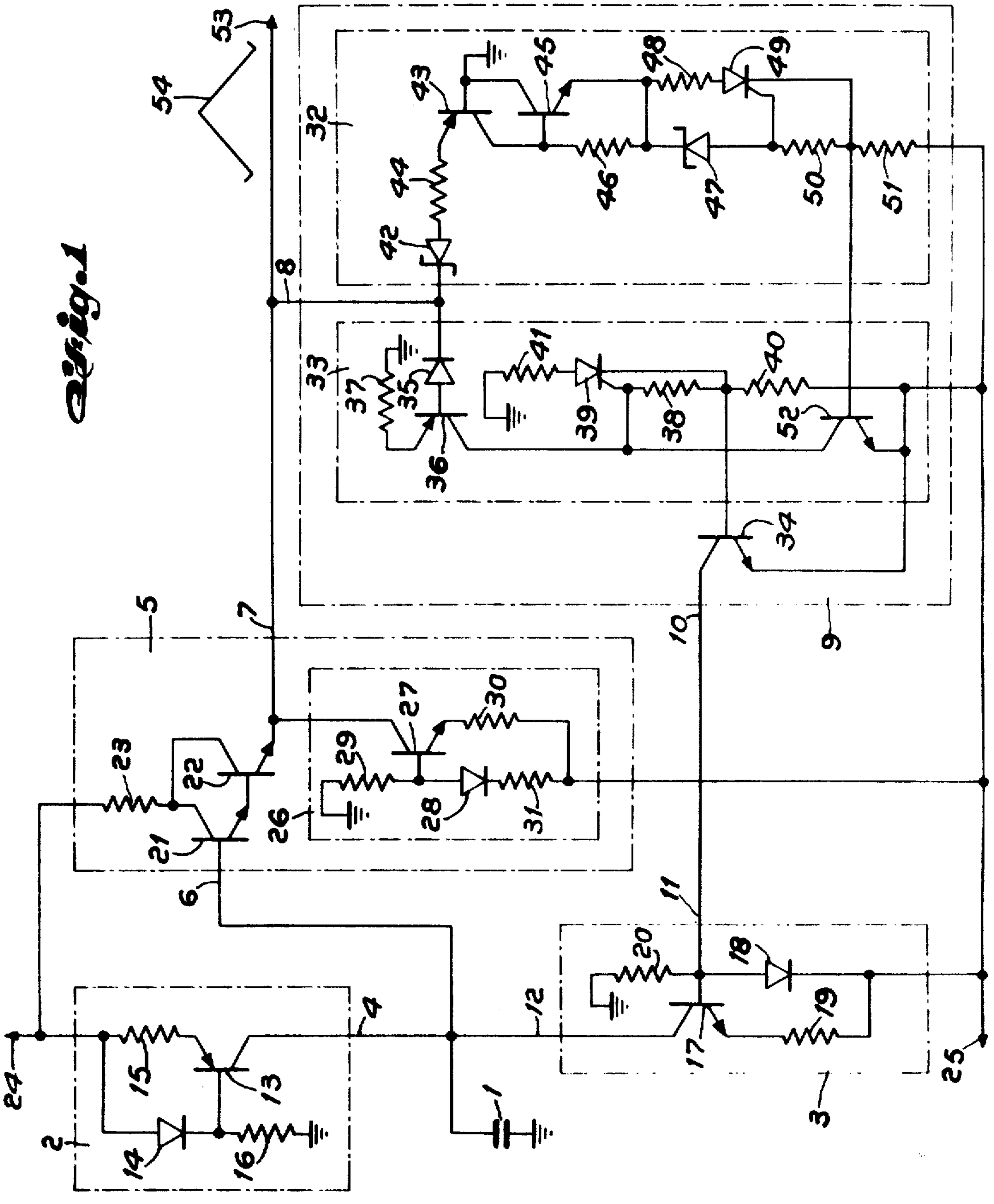
FIG. 1 shows the novel triangular waveform generator circuit.

The operation of the novel free running triangular waveform generator circuit shown in FIG. 1 will now be explained.

The circuit operation is primarily based on charging capacitor 1 from a constant current source 2 and discharging capacitor 1 from a second constant current source 3. This capacitor being a two-terminal device, has one terminal connected to a circuit ground and the second terminal is coupled to the first current generator 2, the second current generator 3 and a buffering circuit 5. The first constant current source 2 supplies a current I to capacitor 1 from output 4 of the first constant current source, and when the second constant current source 3 is in the nonconducting state, capacitor 1 will change toward a voltage V which in the example used is +12 volts. Buffering circuit 5, with its input 6 coupled to capacitor 1, will transmit a first predetermined voltage level from its output 7 to input 8 of a switching circuit 9. The output 10 of switching circuit 9 is coupled to input 11 of the second current source 3. Upon the detection of said first predetermined level by switching circuit 9, switching circuit 9 causes the second current source 3 to switch to a conducting mode of operation. When the second constant current source begins to conduct, a current greater than I ("I" being the charging current from the first constant current source 2) flows from capacitor 1 to terminal 12 of the second constant current source 3. Since the second constant current source is discharging the capacitor at a rate faster than the first constant current source is charging a capacitor, the voltage level across capacitor 1 begins to decrease in a linear fashion. If the rate of discharge of the second constant current source is twice as great as the charging current of the first constant current source, the output triangular waveform will have a symmetrical shape, since the absolute value of the voltage across the capacitor varies at a rate of I/C volts per second during the charging and discharging periods of said capacitor, wherein C represents the capacitive value of the capacitor being charged and discharged and I represents the total charging and discharging current flowing to and from capacitor 1.

Once the second constant current generator 3 is in the conducting state and capacitor 1 is discharging toward a voltage −V (−12 volts for this example), the voltage across capacitor 1 continues to decrease until a second predetermined voltage level is transmitted by buffering circuit 5 to and is sensed by switching circuit 9, which then, in turn, switches the second constant current generator 3 to the nonconducting state. Capacitor 1 again begins to be charged at the rate of I/C from the first constant current generator, as the process repeats itself.

It is thus seen that this circuit produces a self-generating free running linear triangular waveform. Furthermore, capacitor 1 is the only capacitor employed in the entire circuit, and since this capacitor is less than 100 pf., i.e. typically 50 pf., this circuit, which is composed of transistors, diodes, resistors, zener diodes, and silicon controlled rectifiers, can be easily fabricated on a single slice as a monolithic integrated circuit. It is also noted that the circuit can be designed so that switching circuit 9 switches the first current source 2, instead of switching the second current source 3, from the conducting to nonconducting state. The second current source 3 would then continuously discharge current I from capacitor 1, while the first current source 2 is alternately supplying a constant current greater than I to capacitor 1.

The first constant current generator 2 includes a PNP transistor 13, having an emitter, base and collector and a diode 14 having an anode and cathode. The cathode of diode 14 is connected to the base of transistor 13, and the emitter of transistor 13 is connected to one terminal of a resistor 15, typically 510 ohms. The other terminal of resistor 15 is connected to the anode of diode 14 wherein this common connection is connected to an external supply voltage 24 which, for the example shown in FIG. 1, is a positive voltage, typically 12 volts. The common terminal between the cathode of diode 14 and the base of transistor 13 is connected to the circuit ground through resistor 16, typically 12 Kil-ohms. The collector of transistor 13 is connected to the output terminal 4 of the first constant current source 2. The second constant current source 3 includes a NPN transistor 17 having an emitter, base and collector and a diode 18 having an anode and cathode, the base and emitter of transistor 17 being connected to the anode of diode 18, and one terminal of resistor 19 typically 91 ohms, respectively. The other terminal of resistor 19 and the cathode of diode 18, are coupled to an external voltage supply 25, which, for the example shown in FIG. 1, is a negative voltage typically −12 volts. The base of transistor 17 is also connected both to the circuit ground through a resistor 20, typically 12 Kil-ohms, and to terminal 11 of the second constant current generator, while the collector is coupled to terminal 12 of the second constant current generator.

Buffering circuit 5 consists basically of a darlington pair which is coupled to a third constant current generator. The darlington pair consists of NPN transistors 21 and 22 respectively, the emitter of transistor 21 being connected to the base of transistor 22 and the collector of transistor 22 being connected to the collector of transistor 21. The collectors of transistors 21 and 22 are in turn coupled to external voltage supply 24 through resistor 23, typically 510 ohms. The base of transistor 21 is connected to the input 6 of the buffering circuit and the emitter of transistor 22 is connected to the output 7 of the sensing circuit. The voltage across capacitor 1 is transmitted from the base of transistor 21 to the emitter of transistor 22 minus the $V_{BE}$ voltage drops for transistors 21 and 22, and is in turn transmitted to the input 8 of switching circuit 9.

The emitter of transistor 22 is connected to the third constant current source 26. Current source 26 includes NPN transistor 27 having an emitter, base and collector and a diode 28 having an anode and a cathode. The anode of diode 28 and the base of transistor 27 are commonly connected to one terminal of a resistor 29, typically 12 Kil-ohms, while the other terminal of resistor 29 is connected to circuit ground. The emitter of transistor 27 is coupled to external voltage supply 25 through resistor 30, typically 820 ohms, and the cathode of diode 28 is also coupled to external voltage supply 25 through resistor 31, typically 1 Kil-ohm.

The third constant current generator 26 provides a fixed load current for the darlington pair and a relatively high impedance reflected into the base of transistor 21. The constant load current supplied by the third constant current generator 26 prevents a wide variation of current at the base of transistor 21 which greatly improves the linearity of the generated triangular waveform. If the base current at input terminal 6 would substantially vary, it would have the effect of varying the charging current at capacitor 1. In order to produce a linear ramp, the charging current at the capacitor must be kept constant and therefore any variation in the base current at the input to the buffering circuit would destroy this basic criteria for forming a linear triangular waveform.

Switching circuit 9 consists of a first control circuit 32 which senses a first predetermined voltage level, a second control circuit 33 which senses a second predetermined voltage level, and a NPN switching transistor 34. Control circuits 32 and 33, when activated respectively, will switch transistor 34 into either the saturated conducting state or the nonconducting state. The collector of transistor 34 is connected to the output terminal 10 of switching circuit 9 which is in turn directly coupled to the base of the second constant current generator 3. The emitter of transistor 34 is directly coupled to external voltage supply 25, and when transistor 34 is switched into the saturated state, the −12 volts of voltage supply 25 is immediately applied to the base of transistor 17 of the second constant current generator 3, thus causing transistor 17 to switch off, thereby switching the second constant current generator 3 to the nonconducting state. When transistor 34 is turned off the second constant current generator 3 immediately again begins conducting.

The internal operation and circuit description of switching circuit 9 is as follows. Let us assume that the second constant current generator 3 has just been placed in the conducting state and capacitor 1 has begun to discharge towards −12 volts, and the voltage at the output 7 of the buffering circuit 5 is applied to the input 8 of switching circuit 9. Input 8 is directly coupled to the control circuit 33 and the cathode of diode 35. The anode of diode 35 is directly coupled to the base of PNP transistor 36, the emitter of transistor 36 being coupled to the circuit ground through resistor 37, typically 200 ohms. As soon as the voltage transmitted from the buffering circuit is sufficiently negative to forward bias diode 35 and emitter base diode of transistor 36, transistor 36 begins to conduct and supply current through resistor 38, which is typically 3.9K. Resistor 38 has one terminal commonly connected to the collector of transistor 36 and a gate electrode of silicon controlled rectifier (SCR) 39, and the other terminal commonly connected to the cathode of SCR 39 and one terminal of resistor 40, typically 390 ohms. The other terminal of resistor 40 is returned to the external voltage supply 25. As the discharging voltage increases in magnitude, the forward bias applied to transistor 36 increases and the emitter to collector current increases. When the current passing through resistor 38 develops a sufficient voltage drop across the gate to cathode of the SCR 39 (typically 0.7 volts at 25° C.), the SCR 39, previously off, switches on and conducts current from its anode to its cathode. The anode of the SCR 39 is coupled to circuit ground through resistor 41, typically 3.9 Kil-ohms. When the SCR 39 begins to conduct, sufficient current is then supplied to the base of transistor 34 so as to immediately turn transistor 34 to the on (saturated) condition, thereby causing the full −12 volts from the external power supply 25 to be applied to the base of transistor 17 of the second constant current generator 3. As explained previously, the second constant current source then turns off and capacitor 1 begins to charge towards +12 volts. This positive voltage is again transmitted to input 8 of switching circuit 9 which is also coupled to the cathode of zener diode 42 of control circuit 32, the anode of zener diode 42 being coupled to the emitter of PNP transistor 43 through resistor 44, typically 200 ohms. The base of transistor 43 is coupled to circuit ground. The collector of transistor 43 is connected to the base of NPN transistor 45 and one terminal of resistor 46, typically 5.1 Kil-ohms. The collector of transistor 45 is connected to the circuit ground. The other terminal of resistor 46 is commonly connected to the emitter of transistor 45, the cathode of zener diode 47 and one terminal of resistor 48, typically 1 Kil-ohm. The anode of zener diode 47 is commonly connected to a gate terminal of SCR 49 and one terminal of resistor 50, typically 3.9 Kil-ohms. The other terminal of resistor 50 is commonly connected to the cathode of SCR 49, one terminal of resistor 51, typically 390 ohms, and the base of NPN transistor 52, the emitter of transistor 52 being connected to the external voltage supply 25 and the collector being connected to the gate of SCR 39. The other terminal of resistor 51 is coupled to the external voltage supply 25, and the other terminal of resistor 48 is connected to the anode of SCR 49. As soon as the rising positive voltage at input 8 is sufficient to break down zener diode 32 and forward bias the emitter base diode of transistor 43, transistor 43 begins to conduct current through resistor 46, the base emitter diode of transistor 45, zener diode 47, resistors 50 and 51. As the voltage at input 8 continues to increase at the rate of I/C, the emitter base diode of transistor 43 becomes more forward biased and an increasing amount of current flows through resistor 50. When the current passing through resistor 50 develops a sufficient voltage drop across the gate to cathode of SCR 49 (typically 0.7 volts at 25° C.), the SCR 49, previously off, turns on. A high current pulse flows through resistor R48, SCR 49 and resistor 51, as the parasitic capacitances associated with resistor 46, transistors 43 and 45 and zener diode 47 are discharged toward supply potential 25. When SCR diode 49 turns on by this current pulse, transistor 52 switches to the on (saturated) condition and the −12 volts from the external supply 25 is immediately transmitted to the gate of SCR 39. Since the rising positive voltage at input 8 has already reverse biased the emitter base diode of transistor 36 so as to turn transistor 36 off, the application of −12 volts to the gate of SCR 39, turns SCR 39 off, which in turn immediately switches transistor 34 off. When transistor 34 turns off, the second constant current generator 3, turns on as the cycle again repeats itself. As the voltage at terminal 8 decreases, transistor 43 turns off and causes SCR 49 to turn off, resetting switching circuit 32.

Transistor 45 serves as a current and charge amplifier to enable SCR 49 to supply a sufficiently large current pulse (around 8MA) to switch transistor 52 on. Resistors 38 and 40 have approximately a 10:1 resistance ratio, so as to ensure that transistor 34 will not turn on until SCR 39 is switched on. Resistors 50 and 51 also have a 10:1 resistance ratio, so as to ensure that transistor 52 is not switched on until SCR 49 is switched on. Resistor 46 is larger than resistor 50 so that transistor 45 turns on before SCR 49 switches on.

The output for this circuit can be taken from the output of the buffering circuit as shown at circuit output 53 in FIG. 1. The triangular output waveform 54 is shown at circuit output 53. The output can then be applied to the desired loading circuit. If the applied load would draw enough current to load down the buffering circuit, a conventional buffer amplifier, such as an emitter follower, should be inserted between the circuit output 53 and the load. For the component value indicated as used in the circuit of FIG. 1, the output waveform has a frequency of 100 MHz.

Figure 2:
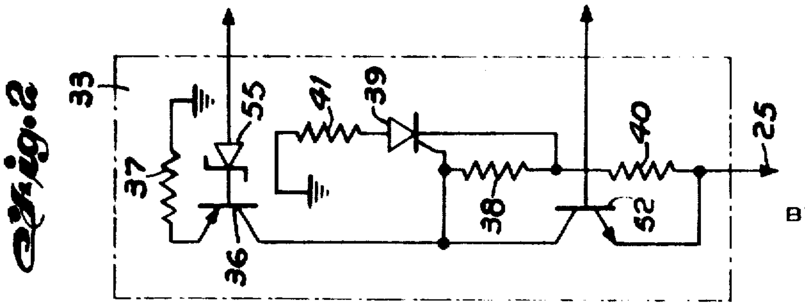
FIG. 2 shows another embodiment of a portion of the switching circuit.

If it would be desirable that the output waveform be made symmetrical around zero potential, the embodiment shown in FIG. 2 may be substituted for this purpose. FIG. 2 shows a duplicate of control circuit 33 except that diode 35 has been replaced by zener diode 55. The cathode of zener diode 55 is coupled to the base of PNP transistor 36 and the anode of zener diode 55 is coupled to the input 8 of switching circuit 9. Zener diode 55 may be selected so that the negative activating voltage necessary to turn SCR 39 on would be equal to the positive activating voltage necessary to turn SCR 49 on.

What we claim is:

1. A free running triangular waveform generator circuit having a linear output comprising:
- a capacitor;
- a first constant current generator coupled to said capacitor, said first current generator supplying a constant charging current to said capacitor;
- a second constant current generator coupled to said capacitor, said second current generator removing a constant discharging current from said capacitor;
- buffering means coupled to said capacitor, said buffering means transmitting a first and second voltage level across said capacitor without loading down said capacitor; and
- means for switching one of said current generators between a conducting and nonconducting state, said switching means coupled to said buffering means and sensing said first and second transmitted voltage levels whereby said first sensed voltage level causes said switching means to switch said one current generator to said conducting state and said second sensed voltage level causes said switching means to switch said one current generator to said nonconducting state.

2. A free running triangular waveform generator circuit according to claim 1 wherein said capacitor has a capacitance of less than 100 pf. and is the only capacitor used in said triangular waveform generator circuit.

3. A free running triangular waveform generator circuit according to claim 1 wherein said first and second current generators each include a transistor having an emitter, base and collector, a diode having an anode and a cathode, the base of said transistor being coupled to the cathode of said diode, the anode of said diode being coupled to an external voltage supply, the emitter of said transistor being coupled to said external voltage supply through a first resistor, the base of said transistor being coupled to a circuit ground through a second resistor, and the collector of said transistor being coupled to said capacitor.

4. A free running triangular waveform generator circuit according to claim 1 wherein said buffering means includes:
- a first and second transistor, each transistor having an emitter, base and collector; and
- a third constant current generator coupled to the emitter of said second transistor, the base of said second transistor being coupled to the emitter of said first transistor, the collectors of said first and second transistors being coupled to an external voltage supply through a resistor, the base of said first transistor being coupled to said capacitor, and the emitter of said second transistor being coupled to said switching means.

5. A free running triangular waveform generator circuit according to claim 4 wherein the linear output waveform is obtained between a circuit ground and the emitter of said second transistor of said buffering means.

6. A free running triangular waveform generator circuit according to claim 1 wherein said switching means includes:
- a first and second control circuit coupled to said buffering means, said first control circuit detects said first voltage level and said second control circuit detects said second voltage level; and
- a switching transistor having an emitter, base and collector, the emitter of said switching transistor being coupled to an external voltage supply, the collector of said switching transistor being coupled to said second current generator, and the base of said switching transistor being coupled to said first and second detected voltage levels, whereby said first detected voltage level causes said switching transistor to turn to the nonconducting state thereby switching said second current generator to the conducting state, and said second detected voltage level causes said switching transistor to switch to the saturated state thereby switching said second current generator to the nonconducting state.

7. A free running triangular waveform generator circuit according to claim 6 wherein said first control circuit includes:
- a zener diode having an anode and a cathode, the cathode of said zener diode being coupled to said sensing means; and
- a transistor having an emitter, base and collector, the emitter of said transistor being coupled through a resistor to the anode of said zener diode whereby the combination of said zener diode and said transistor senses a positive voltage level, said positive voltage level being said first voltage level.

8. A free running triangular waveform generator circuit according to claim 6 wherein said second control circuit includes:
- a diode having an anode and a cathode, the cathode of said diode being coupled to said sensing means; and
- a transistor having an emitter, base and collector, the base of said transistor being coupled to the anode of said diode, whereby the combination of said diode and transistor senses a negative voltage level, said negative voltage level being said second voltage level.

9. A free running triangular waveform generator circuit according to claim 6 wherein said second control circuit includes:
- a zener diode having an anode and a cathode, the anode of said zener diode being coupled to said sensing means; and
- a transistor having an emitter, base and collector, the base of said transistor being coupled to the cathode of said zener diode, whereby the combination of said zener diode and transistor senses a negative voltage, said negative voltage being said second voltage level, so that the linear output waveform is symmetrical about a zero potential.

10. A free running triangular waveform generator circuit according to claim 1 wherein said second current generator is switched between said conducting and nonconducting state.

11. A free running triangular waveform generator circuit according to claim 10 wherein said discharging current is greater than said charging current.

12. A free running triangular waveform generator circuit according to claim 10 wherein said discharging current of said second current generator is twice as large as said charging current of said first current generator.